US009460167B2

(12) United States Patent
Li et al.

(10) Patent No.: US 9,460,167 B2
(45) Date of Patent: *Oct. 4, 2016

(54) TRANSITION FROM FIRST SEARCH RESULTS ENVIRONMENT TO SECOND SEARCH RESULTS ENVIRONMENT

(71) Applicant: Google Inc., Mountain View, CA (US)

(72) Inventors: Hongyi Li, San Francisco, CA (US); Donald O. Tanguay, Jr., Cambridge, MA (US); Daniel Nguyen, Boston, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,064

(22) Filed: Oct. 29, 2015

(65) Prior Publication Data

US 2016/0063074 A1 Mar. 3, 2016

Related U.S. Application Data

(63) Continuation of application No. 14/050,612, filed on Oct. 10, 2013, now Pat. No. 9,201,935.

(60) Provisional application No. 61/886,707, filed on Oct. 4, 2013.

(51) Int. Cl.
 *G06F 17/30* (2006.01)
(52) U.S. Cl.
 CPC ... *G06F 17/30554* (2013.01); *G06F 17/30023* (2013.01); *G06F 17/30058* (2013.01); *G06F 17/30392* (2013.01); *G06F 17/30395* (2013.01); *G06F 17/30873* (2013.01)

(58) Field of Classification Search
 None
 See application file for complete search history.

(56) References Cited

U.S. PATENT DOCUMENTS

| 8,010,525 | B1 | 8/2011 | Boswell |
| 8,024,324 | B2 | 9/2011 | Amitay |
| 2005/0165777 | A1 | 7/2005 | Hurst |
| 2007/0198480 | A1 | 8/2007 | Hogue |
| 2011/0179021 | A1 | 7/2011 | Wen |
| 2014/0304658 | A1 | 10/2014 | Larkina |

OTHER PUBLICATIONS

Bing, "pictures of puppies," [search results screenshot], Bing.com [online]. Retrieved on Oct. 10, 2013, 1 page.

(Continued)

*Primary Examiner* — Hung Q Pham
(74) *Attorney, Agent, or Firm* — Fish & Richardson P.C.

(57) ABSTRACT

Methods, systems, and apparatus, including computer programs encoded on a computer storage medium, for processing search results. In one aspect, a transition from a first search result environment to a second, different search result environment is done in a manner that preserves the user experience of focusing on a selected search result. The transition can be facilitated by an intermediate search result environment that appears during the transition from the first search result environment to the second search result environment. The intermediate search result environment displays search result data of a search result that was selected in the first search result environment. The search result data that is displayed is, for example, data that was provided for display in the first search result environment. For example, in the case of image search results, the search result data that is displayed is a thumbnail image of the image search result.

18 Claims, 6 Drawing Sheets

(56) References Cited

OTHER PUBLICATIONS

Bing, "pictures of puppies," [image search results screenshot], Bing.com [online], retrieved on Oct. 10, 2013. Retrieved from the Internet: URL: www.bing.com/images/search?q=pictures+of+puppies&id=A7843C2EF4AFA618E5573DA6D7620659EA172093&FORM=IQFRBA, 1 page.

International Search Report and Written Opinion in International Application No. PCT/US2014058844, mailed Jan. 9, 2015, 11 pages.

TRANSITION FROM FIRST SEARCH RESULTS ENVIRONMENT TO SECOND SEARCH RESULTS ENVIRONMENT

This application is a continuation application of, and claims priority to, U.S. patent application Ser. No. 14/050,612, titled "TRANSITION FROM FIRST SEARCH RESULTS ENVIRONMENT TO SECOND SEARCH RESULTS ENVIRONMENT," filed on Oct. 10, 2013, which claims the benefit under 35 U.S.C. §119(e) of U.S. Patent Application No. 61/886,707, titled "TRANSITION FROM FIRST SEARCH RESULTS ENVIRONMENT TO SECOND SEARCH RESULTS ENVIRONMENT," filed Oct. 4, 2013. The disclosure of each of the foregoing applications is incorporated herein by reference.

BACKGROUND

This specification relates to information presentation.

The Internet provides access to a wide variety of resources, for example, webpages, image files, audio files, and videos. These resources include content for particular subjects, book articles, or news articles. A search system can select one or more resources in response to receiving a search query. A search query is data that a user submits to a search engine to find information to satisfy the user's informational needs. The search queries are usually in the form of text, e.g., one or more query terms. The search system selects and scores resources based on their relevance to the search query and on their importance relative to other resources, and provides search results that link to the selected resources. The search results are typically ordered according to the scores and presented according to this order.

SUMMARY

When a user selects a search result of a particular type, the selection is a strong signal that the user is interested in information provided in the form referenced by the search result. However, when a user selects a particular type of search result from a search result environment in which multiple types of search results are displayed, some search engines do not transition to a search result environment tailored for the search results of the particular type selected. Furthermore, while some search engines do provide a transition to the search result environment tailored for the search results of the particular type selected, the transition is often disruptive to the user experience. The subject matter of this application provides for a transition from a first search result environment to a second, different search result environment in a manner that preserves the user experience of focusing on a selected search result.

In general, one innovative aspect of the subject matter described in this specification can be embodied in methods that include the action of receiving a selection of a search result in a set of search results displayed in a first search result environment displayed in a display environment, wherein: at least two different types of search results are displayed in the first search results environment, the two types including search results of a first type and search results of a second type, and each search result of the second type references corresponding content of a second type that is determined to be responsive to a search query for which the set of search results was provided, and includes a representation of the content; in response to a selection of one of the search results of the second type as a selected search result: requesting, from a search engine, search results of the second type responsive to the search query; generating, in the display environment, an intermediate search result environment; displaying, in the intermediate search result environment, the representation of the content included in the selected search result; generating in the display environment and in a view hidden by the second search result environment, a second search result environment that is a search results display environment for search results of the second type; displaying in the second search result environment search results of the second type responsive to the query, wherein one of the search results is the selected search result and includes the representation of content; and positioning the second search result environment in a viewport so that content of the second type corresponding to the selected search result is coincident with the representation of content displayed in the intermediate search result environment. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, from a user device, a request requesting search results for a search query, the request specifying a selected search result in a set of search results displayed in a first search result environment displayed in a display environment, wherein: at least two different types of search results are concurrently displayed in the first search results environment, the two types including search results of a first type and search results of a second type, each search result of the second type references corresponding content of a second type that is determined to be responsive to a search query for which the set of search results was provided, and includes a representation of the content, and the selected search result is a search result of the second type; in response to the request, providing the search query to a search process and receiving in response to the search query a set of search results of the second type responsive to the query; providing, to the user device, a resource including instructions the cause the user device to perform operations comprising: generating, in the display environment, an intermediate search result environment; displaying, in the intermediate search result environment, the representation of the content included in the selected search result; generating in the display environment and in a view hidden by the second search result environment, a second search result environment that is a search results display environment for search results of the second type; displaying in the second search result environment search results of the second type responsive to the query, wherein one of the search results is the selected search result and includes the representation of content; and positioning the second search result environment in a viewport so that content of the second type corresponding to the selected search result is coincident with the representation of content displayed in the intermediate search result environment. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter of this application provides a consistent experience between two disparate search result environments, which reduces distractions that would otherwise detract from the user experience. In particular, by presenting search result information for a search result of a first type, and then providing addition search result information of the same type coincident with previously presented search result information, the user's focus is not drawn from the information in which the user has expressed interest. This results in a smooth and non-disruptive user experience.

Additionally, the subject matter of this application ensures that the information the user selected is shown in the subsequent search result environment for a particular query, even if the information would not have been initially presented had the search query been initially submitted from the subsequent search result environment. This is accomplished by inserting the information in an appropriate location in the search results that are provided if the information is not provided in response to the search query. This also enriches the user experience, as the user does not lose the selected information when the user interface transitions to the subsequent search results environment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
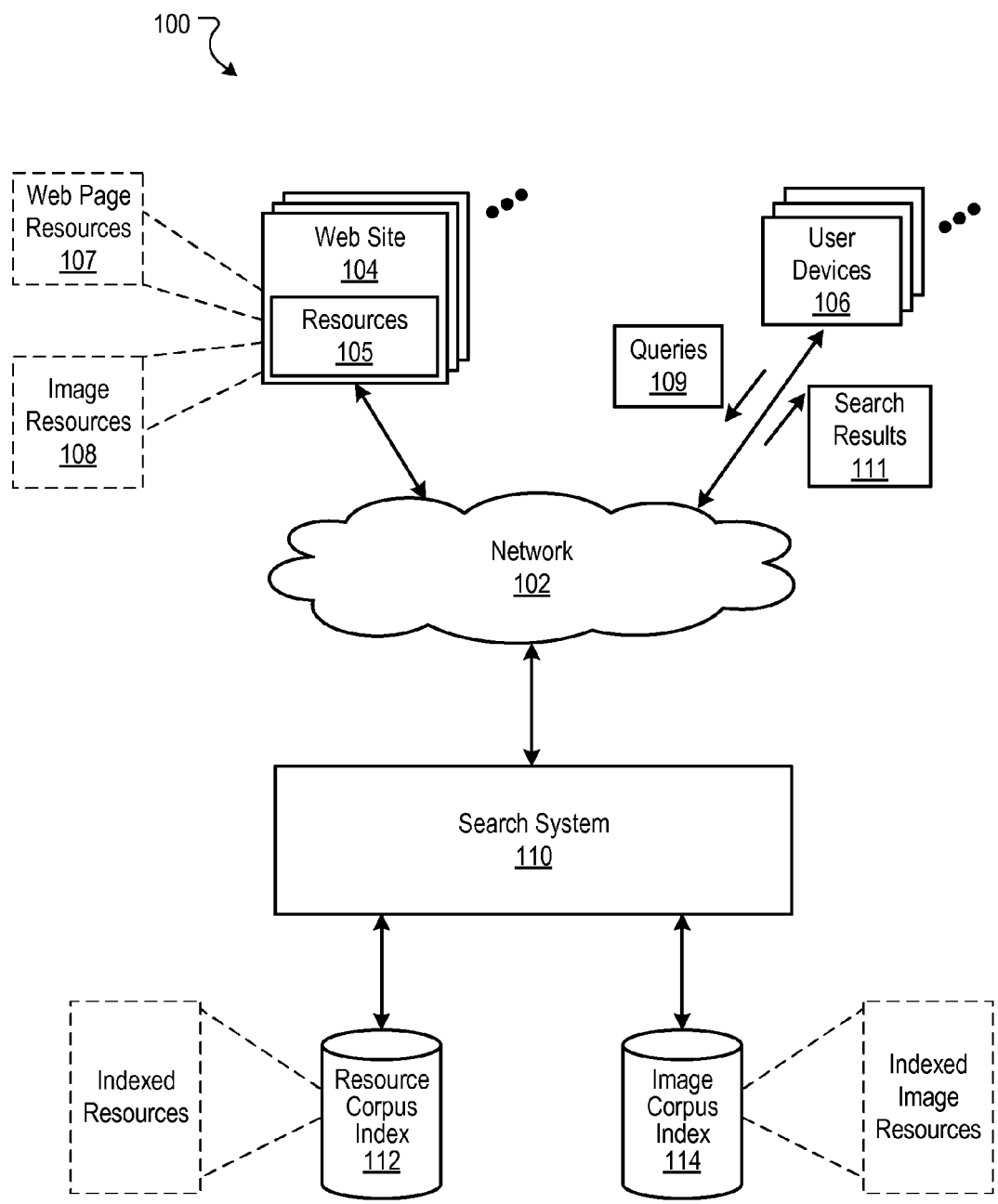
FIG. 1 is a block diagram of an example environment in which search results are processed.

Search engines are used to search corpora. As used herein, a corpus is a collection of resources. Each corpus can include resources of multiple types or be limited to a resource of a single type. For example, a general web corpus can include HTML documents, images documents, videos, etc.; an image corpus, on the other hand, can be limited to a collection of images and metadata for the images. Thus there are different types of corpora that a search engine searches. For example, a search engine searches a general resource corpus index to search resources based on the textual content of the resources and relative authority ratings of the resources. Search results resulting from a search of the general resource corpus index typically include a title of the resource, a snippet of text from the resource, and a link to the resource. Likewise, a search engine searches an image corpus index to search for images that are responsive to a search query. The image corpus index may index the images based on labels (or text) associated with the images, similarity of the images to other images, click through rates of images with respect to queries, and authority ratings of the images. Search results resulting from a search of the image corpus index typically include a thumbnail version of the image, an embedded link to the image, and optionally label text associated with the image. Similarly, other types of corpora, such as a book corpus, a video corpus, etc., can also be searched, and search results for each corresponding corpus can also be of a type particular to that corpus.

Most search engines provide the users options to search a particular corpus. For such searches, the search results are provided in a search result environment particular to the corpus that was searched. For example, an image search result environment differs in look, feel and interaction models from a search environment for a book corpus, a video corpus, etc.

Many search engines, however, also provide a search results environment in which multiple different types of search results can be shown. For example, a search result environment may include general web search results, image search results, video search results, and so on. Typically the different search results are grouped by type.

The subject matter of this application provides for a transition from a first search result environment to a second, different search result environment in a manner that preserves the user experience of focusing on a selected search result. In some implementations, the transition is facilitated by an intermediate search result environment that appears during the transition from the first search result environment to the second search result environment. The intermediate search result environment displays search result data of a search result that was selected in the first search result environment. The search result data that is displayed is, for example, data that was provided for display in the first search result environment. For example, in the case of image search results, the search result data that is displayed is a thumbnail image of the image search result.

While displaying the intermediate search result environment, the user device renders the second search result environment. The intermediate search result environment may be, for example, an HTML element that is substantially opaque and that occupies the active viewport. The second search result environment is rendered in the viewport but is subordinate to the intermediate search result environment so that it is blocked from view by the intermediate search result environment. The second search result environment is positioned within the viewport so that search result data displayed in the intermediate search result environment is coincident with the same or similar search result data displayed in the second search result environment. After the second search result environment has been rendered, the intermediate search result environment is removed. Because the respectively same or similar displayed data in the intermediate search result environment and the second search result environment are coincident, the user does not notice the removal of the intermediate search result environment.

These features and additional features of transitioning from the first search result environment to the second search result environment are described in more detail below. Furthermore, while the examples below are described in the context of image search results and transitioning from a search result environment that is not primarily an image search result environment to a second search result environment that is primarily an image search result environment, the processes can be used for other types of search results. For example, the process can be used to transition from a search result environment that is not primarily a book search result environment to a second search result environment that is primarily a book search result environment. Similar transitions that preserve the user experience can be done for other search result types, such as video search results, product search results, etc.

Example Environment

FIG. 1 is a block diagram of an example environment 100 in which search results are processed. The example environment 100 includes a network 102, e.g., a local area network (LAN), wide area network (WAN), the Internet, or a combination of them, that connects websites 104, user devices 106, and the search system 110. The environment 100 may include many thousands of websites 104 and user devices 106.

A website 104 is one or more resources 105 associated with a domain name, and each website is hosted by one or more servers. An example website is a collection of webpages formatted in hypertext markup language (HTML) that can contain text, graphic images, multimedia content, and programming elements, such as scripts. Each website 104 is maintained by a publisher, e.g., an entity that manages and/or owns the website.

Two example types of resources are webpage resources 107 and image resources 108. Each resource type is associated with a resource address, such as a URL. Webpage resources include text and may also include links to other types of resources that are rendered and displayed with the text of the webpage resource. In particular, image resources 108 are often rendered with webpage resources 107. An example of an image resource 108 is data that is used to render an image of a subject. While image resources are typically included in webpage resources 107, they can also be hosted as separately addressable resources.

To facilitate searching of these resources 105, the search system 110 identifies the resources by crawling the publisher websites 104 and indexing the resources provided by the publisher websites 104. In some implementations, the indexes are stored in a resource corpus index 112 and an image corpus index 114. The indexes 112 and 114 are shown as separate indexes. However, in some implementations, the indexes can be combined in a single index, and search for a respective corpus can be constrained to the portion of the combined index that is used to index the respective corpus.

For a search of textual content, the resource corpus index 112 is searched, and resources are ranked based on information retrieval ("IR") scores that measure the relevance of the resource to the query, and optionally an authority score of each resource relative to other resources. The ranking of the search results is based on relevance scores that are a combination (e.g., sums, products, or other mathematical combinations) of the IR scores and the authority scores. The search results 111 are ordered according to these relevance scores and provided to the user device according to the order.

For a search directed to images that uses a text query as input, the search system 110 accesses the image corpus index 114. In some implementations, the search system 110 determines a relevance score for an image (e.g., relevance with respect to label data for an image, and/or other techniques for determining relevance of an image to a textual query) and combines the score with a relevance feedback score of the image. An example relevance feedback score is a score derived from a click-through rate of an image when that image is referenced in an image search result.

The user devices 106 receive the search results 111, e.g., in the form of a listing of the results in a webpage, and render the pages for presentation to users. The search results are data generated by the search system 110 that identifies resources that are responsive to a particular search query. Each search result includes a link to a corresponding resource, e.g., a link to a webpage for a general search result, or link to an image for an image search result. An example general search result includes a webpage title, a snippet of text, and a URL of the webpage. An example image search result includes a thumbnail of an image, a URL of the webpage in which the image is referenced, and, optionally, labeled data describing the subject of the image.

In some implementations, the search system 110 allows users to specify which corpus is to be searched for a search query. For example, the search system 110 may present, by use of user interface, and input menu that allows the user to select the resource corpus index 112, or the image corpus index 114 when submitting a search query. For example, if the user is solely interested in images, the user may select the image corpus index 114 for searching. Conversely, if the user is interested primarily in text articles, the user may elect to search only the resource corpus index 112. While there is overlap between the indexes 112 and 114, e.g., images may be indexed in both the image corpus index 114 and the resource corpus index 112, the search system 110 uses different search processes for each respective index 112 and 114.

The search result environment, which is the resource that is used to display search results, for an image corpus is different for an image corpus search than it is for a general resource corpus search. This is because the image search result environment is designed to emphasize visual features of image search results, while the search result environment for a general web search is designed to emphasize textual features, or to provide separate emphasis on various features, such as text, images and video.

Figure 2A:
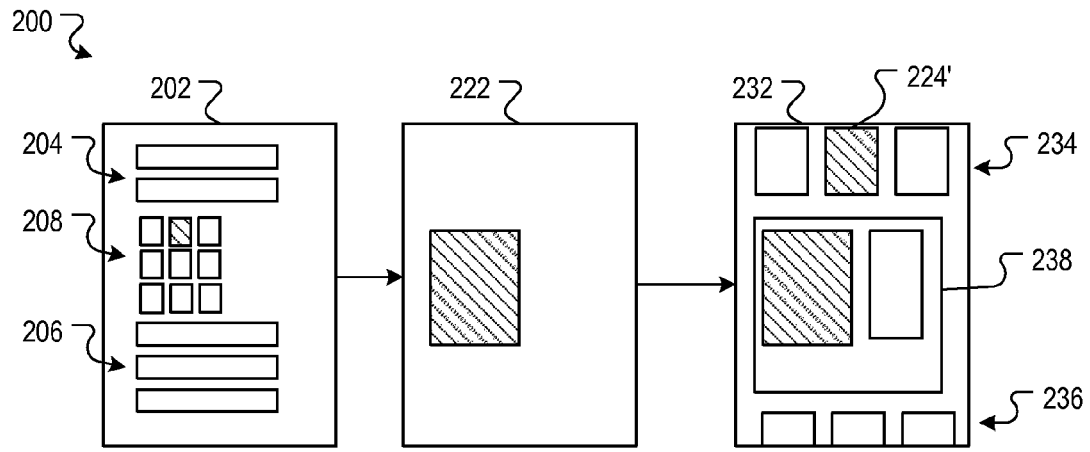
FIGS. 2A-2C are illustrations of transitions from a first search result environment to a second search result environment.

When a user does not specify a specific corpus to search, then by default the emphasis of the search is typically on the resource corpus index 112. However, search results for other corpora can be included in the search result environment for the resource corpus index. For example, FIG. 2A, which illustrates the transition from a first search result environment 202 to a second search result environment 232, illustrates the result types for both environments. The first search result environment 202 includes textual search results 204 and 206, and a grid of image search results 208. The textual search results 204 and 206 include snippets of text from a web page resource, a link to the resource, and, optionally, other information. The image search results include a thumbnail of an image determined to be responsive to the query for which the search results 204, 206 and 208 were provided.

The second search result environment 232 includes rows 234 and 236 of image search 234 and 236, and an inline display environment 238 between the rows. The inline display environment 238 is used to provide additional information about an image search result in which a user has expressed interest.

Figure 2B:
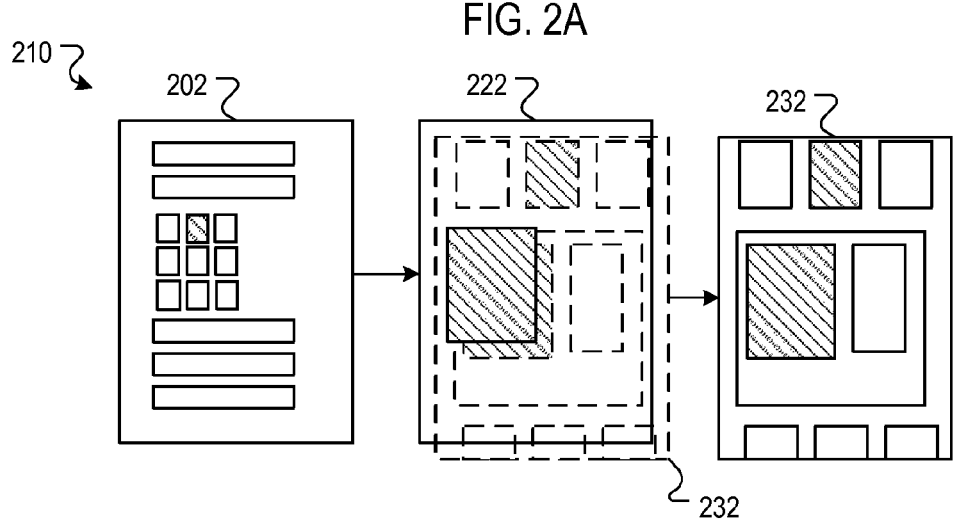
Figure 3A:
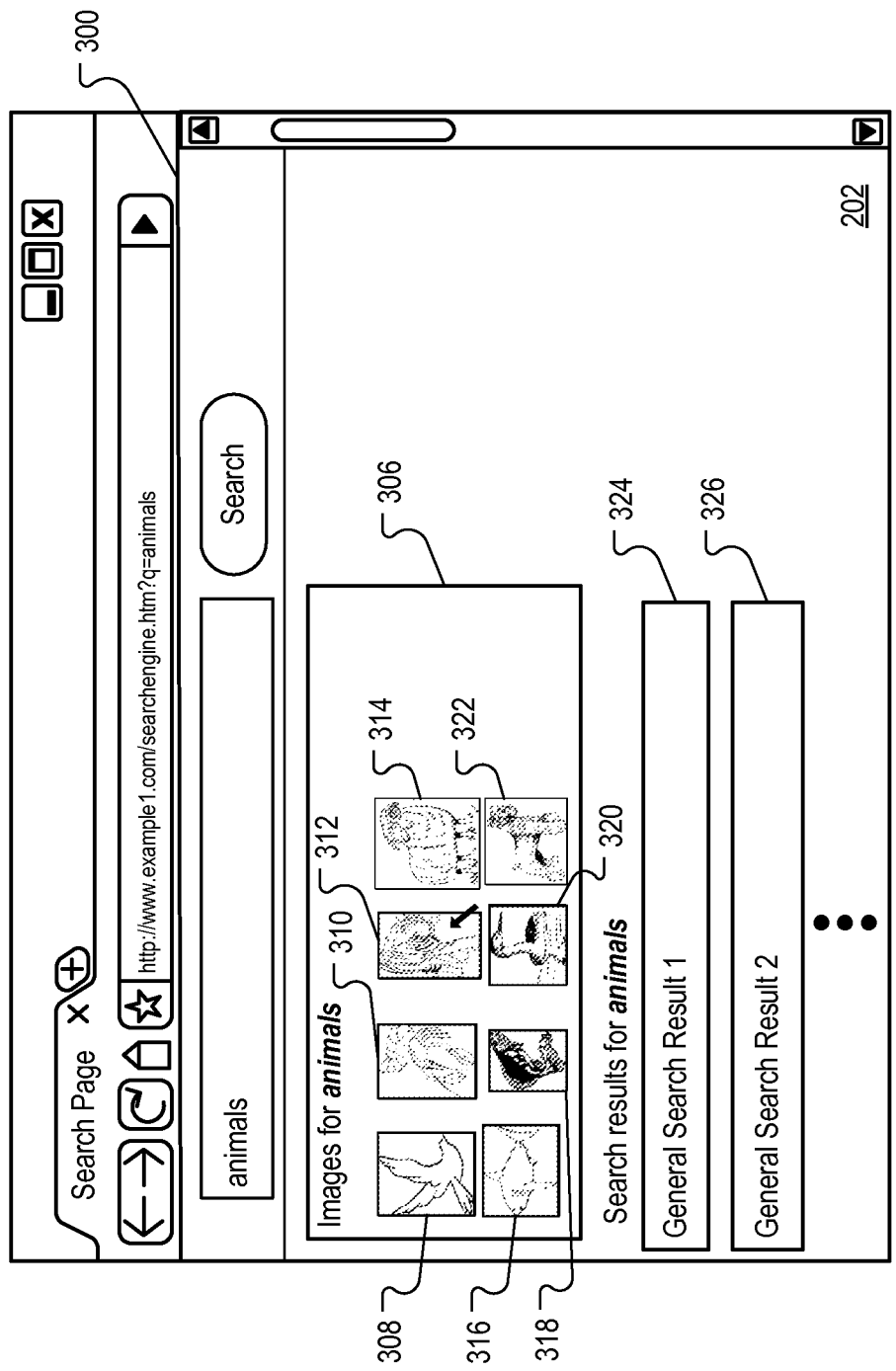
FIGS. 3A-3C are illustrations of user interfaces presented during the transition represented by FIGS. 2A and 2B.
Figure 3B:
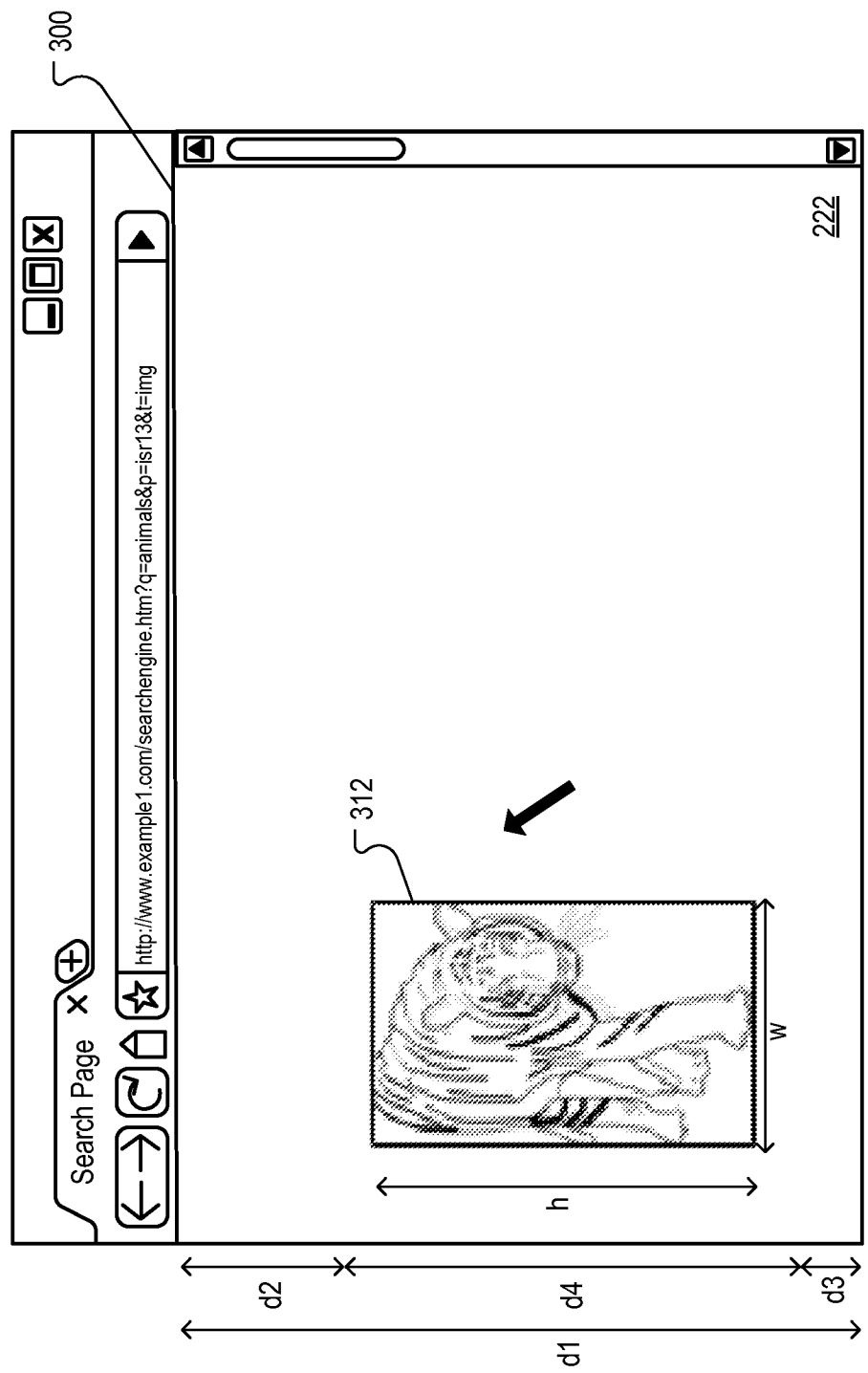
Figure 3C:
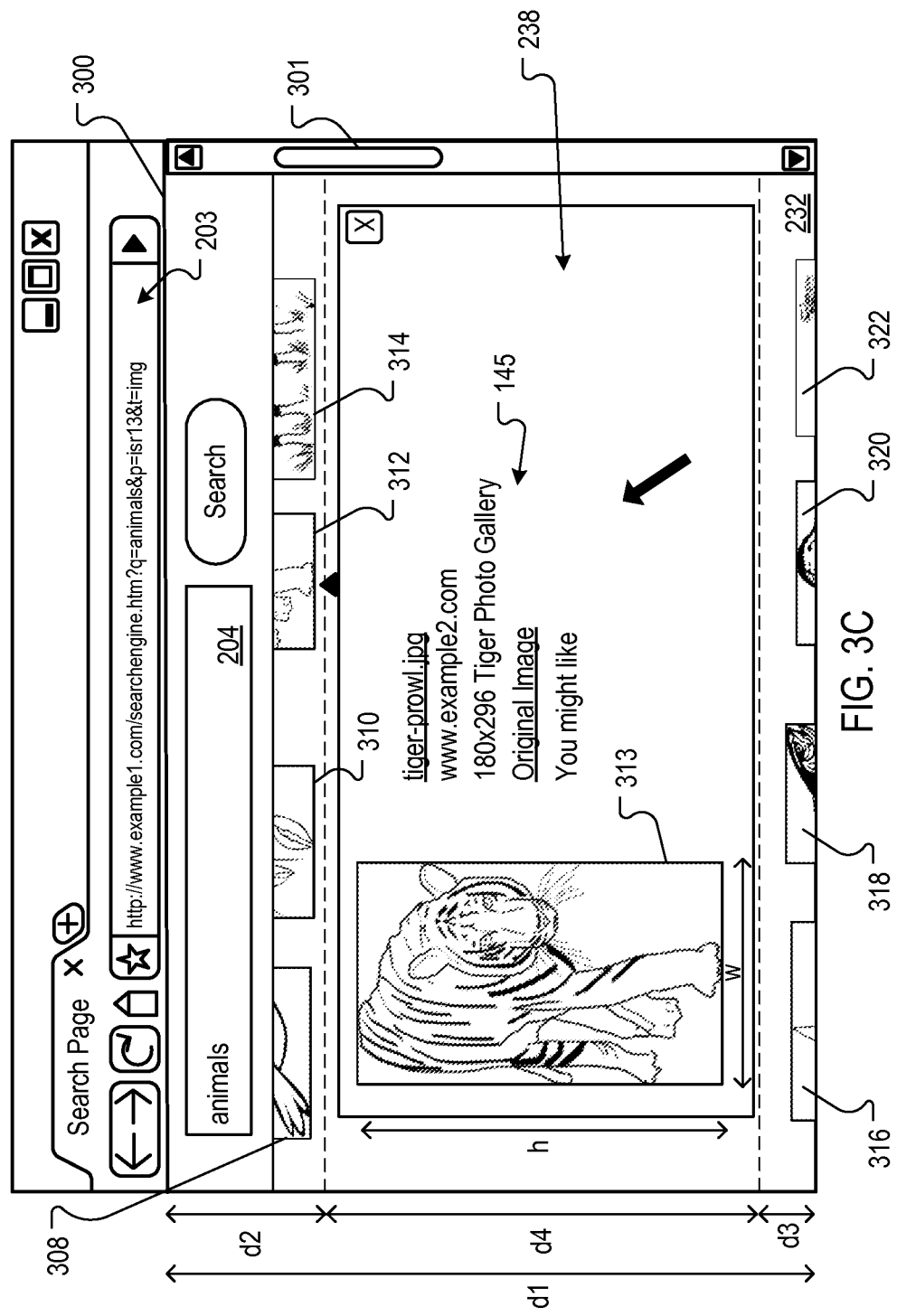
Figure 4:
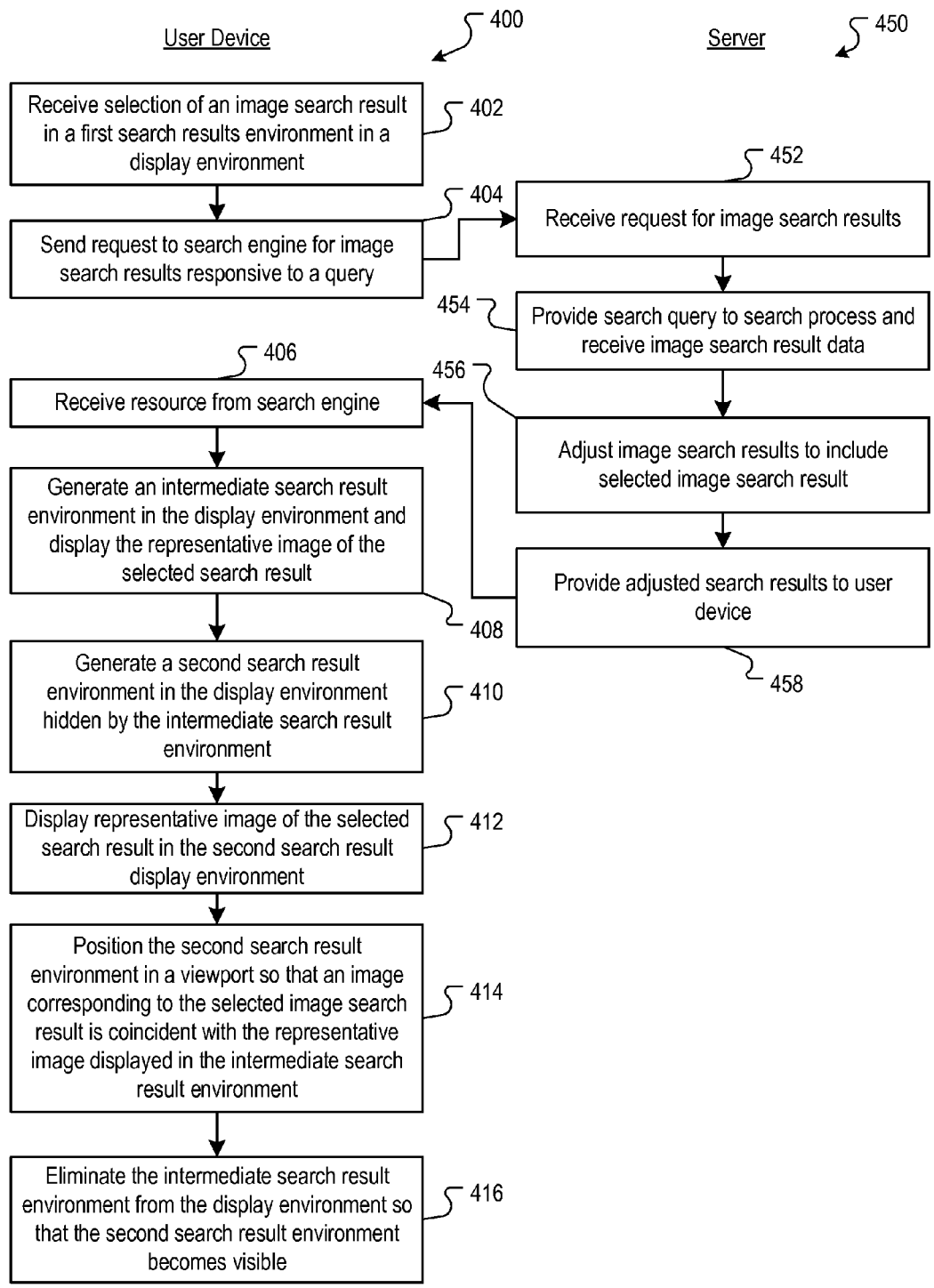
FIG. 4 is a flowchart of example processes for transitioning from a first search result environment to a second search result environment.

The interaction model for image search results 208 in the first search result environment 202 invokes the second search result environment 232 upon selection of an image search result. To facilitate a smooth transition between the two environments, an intermediate search result environment 222 is generated. As described above, the second search result environment 232 is rendered but the view of its rendering is blocked by the opaque feature of the intermediate search result environment 222. This rendering "beneath" the intermediate search result environment 222 is depicted in FIG. 2B, which shows the second search result environment 232 in phantom and below the intermediate search result environment 222. Transition from the first search result environment 202 to the second search result environment 232, as facilitated by the intermediate search result environment 222, is further described with reference to FIGS. 3A-3C and FIG. 4. FIGS. 3A-3C respectively depict example search result environments 202, 222 and 232, and FIG. 4 is a flowchart of example processes 400 and 450 for transitioning from a first search result environment to a second search result environment. For illustrative purposes only, FIGS. 3A-3C and FIG. 4 are described in the context of image search results and other search results that are not of the image search result type.

The process 400 is performed by a user device, and the process 450 is performed by a search engine computer system. While the process operations are described as occurring in a particular order, the order of some of the steps need not be as described in FIG. 4. For example, the generation of the intermediate search result environment does not necessarily require reception of the adjusted search results from the server; in particular, the intermediate environment is typically generated before such results are received. The order in which the operations are depicted is merely selected to facilitate an example description of the processes. For example, the instructions for generating the intermediate search result environment may be included in the instructions used to rendered the first search results environment, e.g., a script that is executed in response to the selection of an image search result. Alternatively, the instructions can be included with the second set of search results that are received.

Transitioning from First Environment to Second Environment

FIG. 3A is an illustration of an example first search result environment 202. The first search result environment 202 is displayed in a display environment 300, such as a viewport of an active browser or other application that facilitates the searching and display of Internet based content.

As shown in FIG. 3A, search results for the query "animals" are displayed. Two different types of search results are concurrently displayed in the first search results environment 202. Results of a first type are show in a display area 306, and are image search results 308-322. The second type are search results 324 and 326, which are not image search results. The results 324 and 326 may be general web search results that include a snippet of text from a web page resource and link to the resource.

Each image search result references a corresponding image resource that is determined to be responsive to a search query and includes a representative image of the image resource. For example, each image for the search results 308-320 may be a smaller version of a corresponding image provided by a corresponding website 104.

In some implementations, the browser application running on the user device executes instructions that facilitate the processing of search results as described in more detail below. Likewise, a service running on a search engine server also executes instructions that facilitate the processing of a search query and search results as described in more detail below.

In operation, the user device receives a selection of a search result in the set of search results displayed in a first search result environment 202. In particular, the user device receives a selection of an image search result in the first search result environment 202 (402). For example, as shown in FIG. 3A, the user selects the image search result 312.

In response to the selection, the user device sends a request to the search engine for image search results responsive to the query for which the first search result environment 202 was provided (404). In some implementations, the request specifies not only the search query, but also the image search result selected, and the ordinal position of the image search with respect to the other image search results. For example, the request may specify the query "animals," the selected search result 312, and the ordinal position of the search result, e.g., position 3, assuming the ordinal positions are in ascending order from left to right and from top row to bottom row. The identification of the selected search result and its ordinal position is used, in some implementations, to further preserve the user experience, as will be described in more detail below.

The server receives the request for image search results (452). In response, the server provides the search query to a search process and receives, in response to the search query, a set of image search results (454).

In some implementations, the server adjusts the image search results to include the selected image search result (456). For example, the server can determine, from the request requesting image search results, the ordinal position of the selected image search result in the image search results that were displayed in the first search result display environment. For example, with respect to FIG. 3A, the server will determine that the selected search result occupied ordinal position 3.

If the returned search results have the selected search result at ordinal position 3, then the search results are returned to the requesting user device. However, if the returned image search results do not have the selected image search results at ordinal position 3, then the server adjusts the received set of image search so that the selected image search result will be displayed in the second search result environment at a same ordinal position—position 3—as it was displayed in the first search result display environment.

While the image search results provided in the first search results environment 202 may be the top ranked image search results for the query, there may be situations when a ranking process may rank image search results slightly differently for the second search results environment 232 than for the first environment 202. In such situations, the selected search result from the first search results environment 202 is moved and/or inserted into the same corresponding ordinal position in the second search results environment 232 as it was displayed in the first search results environment 202.

In variations of this implementation, the search request can identify all the image search results shown in the first search results environment 202 and their respective ordinal positions, and the server can adjust the return set of search results so that the search results shown in the second search results environment 232 at the respective ordinal positions are the same.

The server then provides the adjusted search results and the instructions for rendering the second search results environment 232 to the user device (458). The user device receives the resource from the search engine (406).

The use device also generates an intermediate search result environment 222 in the display environment 300, and displays the representative image in the intermediate search result environment (408). For example, as shown in FIG. 3B, the intermediate search result environment 222 includes the representative image 312 of the selected search result. In this example implementation, the representative image is an expanded version of the thumbnail image shown in the first search result environment 202, and thus is slightly pixelated. Because the representative image 312 is a thumbnail stored in the browser cache, the image can be fetched immediately from the cache and rendered without an appreciable latency that might otherwise occur if the image were fetched from a server external to the user device.

In the example implementation of FIG. 3B, the representative image is adjusted in size to a height h and a width w. This size is coincident with a size of an image that will be displayed in an inline display of height d4 for a given viewport size in the second display environment 232. Furthermore, the image 312 is positioned such that there is at least a top gap between the top border of the environment 222 and the top border of the viewport, as indicated by the gap height d2, and at least a bottom gap between the bottom border of the environment 222 and the bottom border of the viewport, as indicated by the gap height d3.

The dimensions are determined, in part, based on the viewport height d1 and corresponding top and bottom gap sizes. In some implementations, d4 is calculated based on fixed top and bottom gap sizes. For example, the fixed gap sizes, in terms a pixel display units, may be 50 pixels for both the top and bottom gaps, and the height of d4 is determined by the difference of viewport height d1 and the top and bottom gaps, e.g., Display Height=Viewport Height−Top Gap−Bottom Gap Other sizing techniques can also be used.

In some implementations, the intermediate display environment is generated as an HTML element that covers the second search result environment 232 while the environment page loads. The HTML element includes the representative image of the selected search result from the first search results environment, and renders the image and, optionally, other features to resemble at least a sub-portion the second search result environment 232. The HTML element can be instantiated in response to the presence of a query parameter in the URL of the request for search results. For example, as shown in FIGS. 3B and 3C, the URL includes a query parameter "p=isr13." The "p" parameter indicates to the browser that an intermediate search results environment 222 is to be generated, and the "isr13" value indicates the selected image search result, which, in this case, is the image search result at the third ordinal position in the first row in the first search results environment 202.

Example pseudo code to process the intermediate search results environment 222 is as follows:

```
When loading image search page:
    if p in the URL:
        render intermediate environment with opacity set to 1.0;
        set the display style of intermediate environment to "block";
    ...
    [render search results in second environment]
    ...
    if p in the URL:
        open inline result panel for selected search result;
        scroll second environment until image in result panel is
            coincident with image in intermediate environment;
        animate opacity style of intermediate environment from 1.0 to
            0.0 over t seconds;
        set display style of intermediate environment to "none";
```

The pseudo code above results in the intermediate search results environment 222 being opaque so as to hide the view of the rendering of the second search result environment 232 (410).

The user device displays the representative image of the selected search result in the second search result display environment (412), and then positions the second search result environment in a viewport so that an image corresponding to the selected image search result is coincident with the representative image displayed in the intermediate search result environment (414). For example, one of the image search results received from the server is the selected search result and includes the representative image, e.g., the same image search result that was selected in the first search results environment 202 is provided for the second search results environment 232. FIG. 3C depicts the rendered second search result environment 232. An image 313 is shown in an inline display environment 238, along with additional information 145, such as meta information for the image 313. In the implementation show, the image 313 is an image retrieved from a host that hosts the image. Because the hosted image 313 is typically a higher resolution than the thumbnail, the pixilation artifact is not present. However, in other implementations, the image shown could instead be the representative image.

The inline display environment 146 is positioned according to the same process used to position the representative image in the intermediate search results environment 222. The instructions that cause the page to render also include instructions to scroll to the row below which the inline panel is shown, and to generate the inline display environment 238. Thus, the user device can determine the location of the representative image 312 displayed in the intermediate search result environment 222, and navigate, in the second search result environment 232, to the location of the image 313 corresponding to the selected image search result such that the image corresponding to the selected image search result 313 in the second search result environment 232 is coincident with the representative image 312 displayed in the intermediate search result environment 222. The navigation is indicated by the scroll indicator 301 being positioned slightly from the top of the viewport. The inline display environment 238 displays, as the image corresponding to the selected search result, the image resource referenced by the selected image search result. The size of the image resource 313 is also adjusted to match the size of the expanded version of the representative image 312.

Recall that the environment 232, as it is being rendered, is blocked from view by the intermediate search results environment 222. Thus, once rendered and suitably positioned, the user device eliminates the intermediate search result environment 222 from the display environment 300 so that the second search result environment 232 becomes visible (416). As described above in the pseudo code, the elimination can involve a brief fade of the intermediate search results environment 222 from substantially fully opaque to substantially fully transparent to reveal the features of the second search results environment 232. After the fade out is complete, the intermediate search results environment 222 is eliminated, e.g., the HTML element is removed from the display environment 300, and the user may access the second search results environment 222.

Additional Variations

Figure 2C:
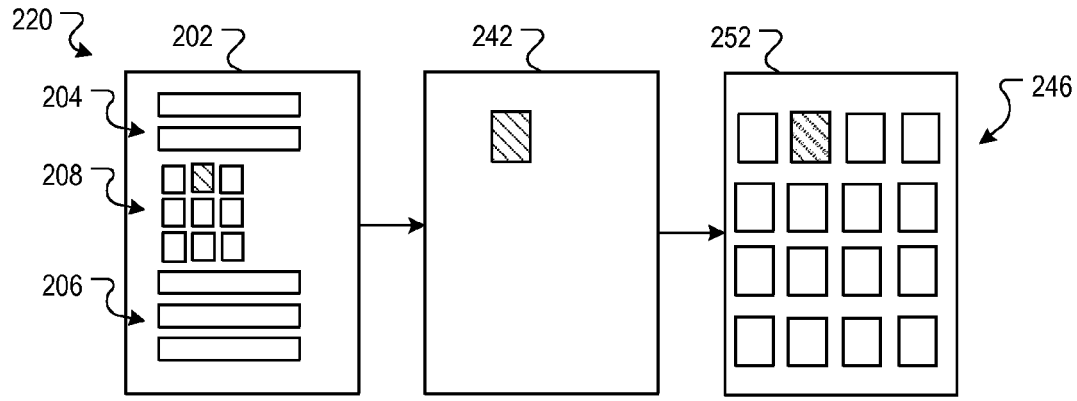

FIG. 2C shows the same image search results in the first two rows of the second search result environment 232 as shown in the first search result environment 202. As described above, however, other search results could be shown, and only the selected search result 312 occupies the same ordinal position in both environments.

In other implementations, the selected search result need not occupy the same ordinal positions. Instead, the selected search result could always be inserted at the first ordinal position, or some other ordinal position.

Other search result environments can be transitioned to in additional to the example environment described above. For example, FIG. 2C illustrates a search result environment in which image search results (or search results of some other type, such as video search results, book search results, etc.)

are displayed in a thumbnail grid of columns and rows in a second search result environment 252. The intermediate search result environment 242 in FIG. 2C is generated in a manner similar to the intermediate search result environment 222 of FIG. 2A, except that the search result data displayed in the intermediate search result environment 242 is positioned differently and sized to be coincident with the corresponding search result data displayed in the second display environment 252.

As described above, the systems and processes of this written description are not limited to processing transitions to an image search result display environment. The processes can be used for other types of search results. For example, the process can be used to transition from a search result environment that is not primarily a book search result environment to a second search result environment that is primarily a book search result environment. Similar transitions that preserve the user experience can be done for other search result types, such as video search results, product search results, etc. More generally, the systems and processes can be used when at least two different types of search results are concurrently displayed in the first search results environment. Each search result of the second type references corresponding content of a second type responsive to a search query for which the set of search results was provided, and includes a representation of the content. For example, for image search results, the representation is a thumbnail; for book search results, the representation is a book cover; for video search results, the representation is a video still; and so on. Thus, in response to a selection of one of the search results of the second type, an intermediate search result environment is generated, and in which is displayed the representation of the content included in the selected search result. For example, for a book search result, the thumbnail image of the book cover may be fetched from the browser cache and displayed. The second search result environment is then in a viewport so that content of the second type corresponding to the selected search result is coincident with the representation of content displayed in the intermediate search result environment. Then, after rendering, the intermediate search result environment is eliminated from the display environment so that the second search result environment becomes visible.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device. Data generated at the user device, e.g., a result of the user interaction can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A user device, comprising a processor in data communication with a non-transitory computer storage medium encoded with instructions that when executed by processor cause the user device to perform operations comprising:

displaying, in a first search result environment of a display environment, a set of search results that include search results of a first type and search results of a second type that is different from the first type, wherein each search result of the second type references corresponding content of the second type that is determined to be responsive to a search query for which the set of search results was provided, and includes a representation of the corresponding content; and selecting a search result of the second type as a selected search result and in response:

generating, in the display environment, an opaque intermediate search result environment;

displaying, in the opaque intermediate search result environment, the representation of the corresponding content included in the selected search result;

generating in the display environment and in a view hidden by the opaque intermediate search result environment, a second search result environment that is a search results display environment for search results of the second type;

displaying in the second search result environment hidden by the opaque intermediate search result environment, search results of the second type responsive to the search query;

positioning the second search result environment to cause the corresponding content of the second type corresponding to the selected search result to be coincident with the representation of content displayed in the opaque intermediate search result environment in response to the positioning;

adjusting over a fade-out time period an opacity of the opaque intermediate search result environment from substantially opaque to substantially transparent to cause the second search result environment to become visible; and eliminating the opaque intermediate search result environment from the display environment after the opacity is adjusted to substantially transparent.

2. The user device of claim 1, wherein:
the second type of search results are image search results, wherein each image search result references a corresponding image resource that is determined to be responsive to a search query for which the set of search results was provided, and includes a representative image of the image resource as the representation of content;
displaying, in the opaque intermediate search result environment, an expanded representation of the content included in the selected search result comprises displaying, in the opaque intermediate search result environment, the representative image included in the selected image search result;
generating the second search results display environment comprises generating an image search results display environment;
displaying in the second search result environment at least the search results of the second type responsive to the search query, comprises displaying in the second search result environment image search results responsive to the search query, wherein one of the image search results is the selected search result and includes the representative image; and
positioning the second search result environment in a viewport, wherein the corresponding content of the second type corresponding to the selected search result is coincident with the expanded representation of content displayed in the opaque intermediate search result environment comprises positioning the second search result environment in a viewport, wherein an image corresponding to the selected image search result is coincident with the representative image displayed in the opaque intermediate search result environment in response to the positioning of the second search result environment.

3. The user device of claim 2, wherein:
displaying, in the opaque intermediate search result environment, the representative image included in the selected image search result comprises displaying in the opaque intermediate search result environment an expanded version of the representative image; and
displaying in the second search result environment image search results responsive to the search query comprises:
displaying the image search results in a plurality of rows;
generating in the second search result environment an inline display environment between a first row and a second row of image search results, wherein the selected image search result is included in one of the first and second rows, and the second row is immediately subsequent to the first row; and
generating in the inline display environment between the first and second row, the image resource referenced by the selected image search result, and wherein a size of the image resource is adjusted to match the size of the expanded version of the representative image.

4. The user device of claim 2, wherein:
displaying, in the opaque intermediate search result environment, the representative image included in the selected image search result comprises displaying in the opaque intermediate search result environment the selected image search result; and displaying in the second search result environment image search results responsive to the search query comprises:
displaying the image search results in a plurality of rows, wherein the selected image search result in the second search result environment is displayed at a position in the viewport coincident with a position of the selected image search result in the second display environment.

5. The user device of claim 2, wherein positioning the second search result environment in a viewport wherein an image corresponding to the selected image search result is coincident with the representative image displayed in the opaque intermediate search result environment comprises:
determining a location of the representative image displayed in the opaque intermediate search result environment; and
navigating, in the second search result environment, to the location of the image corresponding to the selected image search result such that the image corresponding to the selected image search result in the second search result environment is coincident with the representative image displayed in the opaque intermediate search result environment.

6. The user device of claim 2, wherein generating, in the display environment, an opaque intermediate search result environment comprises generating the opaque intermediate search result environment by executing instructions embedded in instructions for rendering the first search result environment.

7. A computer implemented method, comprising:
displaying, in a first search result environment of a display environment, a set of search results that include search results of a first type and search results of a second type that is different from the first type, wherein each search result of the second type references corresponding content of the second type that is determined to be responsive to a search query for which the set of search results was provided, and includes a representation of the corresponding content; and
selecting a search result of the second type as a selected search result and in response:
generating, in the display environment, an opaque intermediate search result environment;
displaying, in the opaque intermediate search result environment, the representation of the corresponding content included in the selected search result;
generating in the display environment and in a view hidden by the opaque intermediate search result environment, a second search result environment that is a search results display environment for search results of the second type;
displaying in the second search result environment hidden by the opaque intermediate search result environment, search results of the second type responsive to the search query;
positioning the second search result environment to cause the corresponding content of the second type corresponding to the selected search result to be coincident with the representation of content displayed in the opaque intermediate search result environment in response to the positioning;
adjusting over a fade-out time period an opacity of the opaque intermediate search result environment from substantially opaque to substantially transparent to cause the second search result environment to become visible; and eliminating the opaque intermediate search result environment from the display environment after the opacity is adjusted to substantially transparent.

8. The computer-implemented method of claim 7, wherein:
the second type of search results are image search results, wherein each image search result references a corresponding image resource that is determined to be responsive to a search query for which the set of search results was provided, and includes a representative image of the image resource as the representation of content;
displaying, in the opaque intermediate search result environment, an expanded representation of the content included in the selected search result comprises displaying, in the opaque intermediate search result environment, the representative image included in the selected image search result;
generating the second search results display environment comprises generating an image search results display environment;
displaying in the second search result environment at least the search results of the second type responsive to the search query, comprises displaying in the second search result environment image search results responsive to the search query, wherein one of the image search results is the selected search result and includes the representative image; and
positioning the second search result environment in a viewport, wherein the corresponding content of the second type corresponding to the selected search result is coincident with the expanded representation of content displayed in the opaque intermediate search result environment comprises positioning the second search result environment in a viewport, wherein an image corresponding to the selected image search result is coincident with the representative image displayed in the opaque intermediate search result environment in response to the positioning of the second search result environment.

9. The computer-implemented method of claim 8, wherein:
displaying, in the opaque intermediate search result environment, the representative image included in the selected image search result comprises displaying in the opaque intermediate search result environment an expanded version of the representative image; and
displaying in the second search result environment image search results responsive to the search query comprises:
displaying the image search results in a plurality of rows;
generating in the second search result environment an inline display environment between a first row and a second row of image search results, wherein the selected image search result is included in one of the first and second rows, and the second row is immediately subsequent to the first row; and
generating in the inline display environment between the first and second row, the image resource referenced by the selected image search result, and wherein a size of the image resource is adjusted to match the size of the expanded version of the representative image.

10. The computer-implemented method of claim 8, wherein:
displaying, in the opaque intermediate search result environment, the representative image included in the selected image search result comprises displaying in the opaque intermediate search result environment the selected image search result; and
displaying in the second search result environment image search results responsive to the search query comprises:
displaying the image search results in a plurality of rows, wherein the selected image search result in the second search result environment is displayed at a position in the viewport coincident with a position of the selected image search result in the second display environment.

11. The computer-implemented method of claim 8, wherein positioning the second search result environment in a viewport wherein an image corresponding to the selected image search result is coincident with the representative image displayed in the opaque intermediate search result environment comprises:
determining a location of the representative image displayed in the opaque intermediate search result environment; and
navigating, in the second search result environment, to the location of the image corresponding to the selected image search result such that the image corresponding to the selected image search result in the second search result environment is coincident with the representative image displayed in the opaque intermediate search result environment.

12. The computer-implemented method of claim 8, wherein generating, in the display environment, an opaque intermediate search result environment comprises generating the opaque intermediate search result environment by executing instructions embedded in instructions for rendering the first search result environment.

13. A non-transitory computer storage medium encoded with a computer program, the program comprising instructions that when executed by data processing apparatus cause the data processing apparatus to perform operations comprising:
displaying, in a first search result environment of a display environment, a set of search results that include search results of a first type and search results of a second type that is different from the first type, wherein each search result of the second type references corresponding content of the second type that is determined to be responsive to a search query for which the set of search results was provided, and includes a representation of the corresponding content; and
selecting a search result of the second type as a selected search result and in response:
generating, in the display environment, an opaque intermediate search result environment;
displaying, in the opaque intermediate search result environment, the representation of the corresponding content included in the selected search result;
generating in the display environment and in a view hidden by the opaque intermediate search result environment, a second search result environment that is a search results display environment for search results of the second type;
displaying in the second search result environment hidden by the opaque intermediate search result environment, search results of the second type responsive to the search query;
positioning the second search result environment to cause the corresponding content of the second type corresponding to the selected search result to be coincident with the representation of content displayed in the opaque intermediate search result environment in response to the positioning;

adjusting over a fade-out time period an opacity of the opaque intermediate search result environment from substantially opaque to substantially transparent to cause the second search result environment to become visible; and eliminating the opaque intermediate search result environment from the display environment after the opacity is adjusted to substantially transparent.

14. The non-transitory computer storage medium of claim 13, wherein:

the second type of search results are image search results, wherein each image search result references a corresponding image resource that is determined to be responsive to a search query for which the set of search results was provided, and includes a representative image of the image resource as the representation of content;

displaying, in the opaque intermediate search result environment, an expanded representation of the content included in the selected search result comprises displaying, in the opaque intermediate search result environment, the representative image included in the selected image search result;

generating the second search results display environment comprises generating an image search results display environment;

displaying in the second search result environment at least the search results of the second type responsive to the search query, comprises displaying in the second search result environment image search results responsive to the search query, wherein one of the image search results is the selected search result and includes the representative image; and positioning the second search result environment in a viewport, wherein the corresponding content of the second type corresponding to the selected search result is coincident with the expanded representation of content displayed in the opaque intermediate search result environment comprises positioning the second search result environment in a viewport, wherein an image corresponding to the selected image search result is coincident with the representative image displayed in the opaque intermediate search result environment in response to the positioning of the second search result environment.

15. The non-transitory computer storage medium of claim 14, wherein:

displaying, in the opaque intermediate search result environment, the representative image included in the selected image search result comprises displaying in the opaque intermediate search result environment an expanded version of the representative image; and displaying in the second search result environment image search results responsive to the search query comprises:

displaying the image search results in a plurality of rows;

generating in the second search result environment an inline display environment between a first row and a second row of image search results, wherein the selected image search result is included in one of the first and second rows, and the second row is immediately subsequent to the first row; and generating in the inline display environment between the first and second row, the image resource referenced by the selected image search result, and wherein a size of the image resource is adjusted to match the size of the expanded version of the representative image.

16. The non-transitory computer storage medium of claim 14, wherein:

displaying, in the opaque intermediate search result environment, the representative image included in the selected image search result comprises displaying in the opaque intermediate search result environment the selected image search result; and displaying in the second search result environment image search results responsive to the search query comprises:

displaying the image search results in a plurality of rows, wherein the selected image search result in the second search result environment is displayed at a position in the viewport coincident with a position of the selected image search result in the second display environment.

17. The non-transitory computer storage medium of claim 14, wherein positioning the second search result environment in a viewport wherein an image corresponding to the selected image search result is coincident with the representative image displayed in the opaque intermediate search result environment comprises:

determining a location of the representative image displayed in the opaque intermediate search result environment; and navigating, in the second search result environment, to the location of the image corresponding to the selected image search result such that the image corresponding to the selected image search result in the second search result environment is coincident with the representative image displayed in the opaque intermediate search result environment.

18. The non-transitory computer storage medium of claim 14, wherein generating, in the display environment, an opaque intermediate search result environment comprises generating the opaque intermediate search result environment by executing instructions embedded in instructions for rendering the first search result environment.

* * * * *